United States Patent
Leperen (10) Patent No.: US 6,741,267 B1
(45) Date of Patent: May 25, 2004

(54) KEYBOARD FOR AN ELECTRONIC WRITEBOARD AND METHOD

(75) Inventor: Taco Van Leperen, Calgary (CA)

(73) Assignee: Smart Technologies, Inc., Calgary (CA)

(*) Notice: Subject to any disclaimer, the term of this patent is extended or adjusted under 35 U.S.C. 154(b) by 0 days.

(21) Appl. No.: 09/182,475

(22) Filed: Oct. 30, 1998

(51) Int. Cl.[7] .................................................. G09G 5/00
(52) U.S. Cl. .......................... 345/773; 345/156; 345/173
(58) Field of Search ................................. 345/168, 173, 345/172, 810, 828, 831, 840, 773, 156, 771, 772

(56) References Cited

U.S. PATENT DOCUMENTS 5,448,263 A * 9/1995 Martin ........................ 345/173
5,581,243 A * 12/1996 Oullette et al. ............. 345/173
5,818,451 A * 10/1998 Bertram et al. ............... 341/24

* cited by examiner

Primary Examiner—Richard Hjerpe
Assistant Examiner—Duc Q Dinh
(74) Attorney, Agent, or Firm—Katten Muchin Zavis Rosenman (57) ABSTRACT

An electronic writeboard for communicating with a computer including applications software and running an active application comprises a touch sensitive panel on which the screen image output of the computer is displayed. The touch sensitive panel is responsive to user contact and generates events. A keyboard window is displayed on the touch sensitive panel and includes a keyboard having a plurality of user selectable keys. A driver receives the events and senses user contact on the touch sensitive panel within the keyboard window and generates messages in response thereto. A controller executing a keyboard application receives the messages. The keyboard application processes the messages to provide data to the active application running on the computer corresponding to keys of the keyboard contacted by the user.

26 Claims, 3 Drawing Sheets

KEYBOARD FOR AN ELECTRONIC WRITEBOARD AND METHOD

FIELD OF THE INVENTION

The present invention relates to electronic writeboards and in particular to an on-screen keyboard for an electronic writeboard.

BACKGROUND OF THE INVENTION

Electronic writeboards or whiteboards (EWBs) are known in the art and have been used in conjunction with host computers executing applications software to provide enhanced multimedia and teleconferencing capabilities. An example of an electronic writeboard of this nature is sold by SMART Technologies Inc. of Calgary, Alberta, Canada under the name SMART Board. The SMART Board electronic writeboard includes a touch sensitive panel, a tool tray accommodating a plurality of tools such as colored pens and an eraser, as well as a driver and an associated controller.

In use, the electronic writeboard is connected to a host processor such as a personal computer operating in a Windows® (computer operating system) environment and executing applications software, via a serial data connection. The electronic writeboard can be operated in one of three modes, namely a projected mouse mode, a projected mark-up mode and a non-projected mode.

In the projected mouse mode, the image displayed on the monitor of the personal computer is projected onto the touch sensitive panel. In this case, the electronic writeboard functions as a giant mouse providing input to the personal computer in response to user contact with the touch sensitive panel. Specifically, the electronic writeboard generates mouse events in response to user contact with the touch sensitive panel, which are conveyed to the personal computer for processing. Thus, by contacting the touch sensitive panel, the personal computer can be conditioned to open and display menus, to activate displayed menus, to drag icons, to execute software and to switch applications by changing input focus. The latter event of course is achieved by contacting the touch sensitive panel outside of the window of the active application running on the personal computer.

In the projected mark-up mode, the coloured pens and eraser are used to contact the touch sensitive panel. The active application running on the personal computer tracks where writing and erasing has occurred and maintains a computerized image of what is drawn on and erased from the touch sensitive panel. The computerized image is projected onto the touch sensitive panel so that the user can see the computerized image.

In the non-projected mode, there is no image displayed on the touch sensitive panel by the computer. Contact made on the touch sensitive panel is recorded on the attached computer. Since the touch sensitive panel is in non-projected mode, it is not interactive since users cannot see how their strokes are being recorded. For this reason, in non-projected mode, people write on the touch sensitive panel with standard dry-eraser markers. The computer then tracks their writing and allows them to save the notes later.

To enhance user input abilities, on-screen keyboards for use with electronic writeboards have been considered. For example, Innovative Management Group Inc. of California, U.S.A. has developed an on-screen keyboard sold under the name My-T-Touch. The My-T-Touch keyboard is an extension of a touchscreen interface and uses "Heads Up Display" technology designed to keep a user's focus and concentration in one place. Thus, visual re-focusing and re-positioning, caused by the up and down motion of going from screen to keyboard to screen is reduced.

Unfortunately, prior art on-screen keyboards do not address certain technical issues and therefore, suffer a number of problems. For example, some computer platforms such as Microsoft Windows® always ensure that an active application has input focus. In other words, these computer platforms ensure that any application that is selected through a mouse click receives input focus, i.e. the application becomes active. Thus, when a user contacts a prior art on-screen keyboard displayed on a touch sensitive panel to enter text into an active application, input focus is switched from the active application to the on-screen keyboard.

Unfortunately, only the application with input focus may receive inputs from peripheral devices, such as a mouse or a keyboard. Therefore input focus must be removed from the on-screen keyboard and given back to the application in order for the application to receive any input from the on-screen keyboard. Switching input focus from the on-screen keyboard to the application each time the on-screen keyboard is touched causes many unpleasant side effects. Firstly, a change in the activation state of an application causes the application to refresh or redraw portions of itself. This means that every time input focus is changed from the active application to the on-screen keyboard and then back to the application, the application will flicker as it refreshes. Secondly, a loss of input focus causes the application to close all of its open menus. As a result, prior art on-screen keyboards cannot be used to navigate through the menus of an active application. Finally, some applications, such as Internet Explorer™ (Internet browser), do not retain the text insertion point whenever input focus is lost. This means, that when input focus is switched from the active application to the on-screen keyboard and then back to the application, the cursor is often positioned at a different point than where the cursor was prior to the active application losing input focus. In some circumstances, this makes it impossible to type text into certain fields using an on-screen keyboard.

It is therefore an object of the present invention to provide a novel on-screen keyboard for an electronic writeboard and an interactive display system incorporating the same.

SUMMARY OF THE INVENTION

According to one aspect of the present invention there is provided an electronic writeboard for communicating with a computer including applications software and running an active application comprising:

a touch sensitive panel on which the screen image output of said computer is displayed, said touch sensitive panel being responsive to user contact and generating events;

a keyboard window displayed on said touch sensitive panel and including a keyboard having a plurality of user selectable keys;

a driver receiving said events, said driver sensing user contact on said touch sensitive panel within said keyboard window and generating messages in response thereto; and a controller executing a keyboard application and receiving said messages, said keyboard application processing said messages to provide data to the active application running on said computer corresponding to keys of said keyboard contacted by said user.

In a preferred embodiment, the driver passes events resulting from user contact on the touch sensitive panel outside of the keyboard window directly to the computer for processing. During initialization, the controller registers with the driver and provides a keyboard window handler establishing the location of the keyboard window on the touch sensitive panel and a set of message identifiers to allow the driver to communicate with the keyboard application. The driver uses the message identifiers to generate a message to the keyboard application in response to a mouse down event resulting from user contact within the keyboard window. A flag is also set by the driver so that subsequent mouse move events or a mouse up event result in the generation of messages or a message to the keyboard application.

It is also preferred that the keyboard application signals the computer to switch input focus to another application if input focus is given to the keyboard window.

According to another aspect of the present invention there is provided an interactive display system comprising:

an electronic writeboard;

a computer connected to said electronic writeboard, said computer including applications software and running an active application; and a projector coupled to said computer and projecting the screen image of said computer onto said electronic writeboard wherein said electronic writeboard includes:
  a touch sensitive panel on which the screen image output of said computer is displayed, said touch sensitive panel being responsive to user contact and generating events;
  a keyboard window displayed on said touch sensitive panel and including a keyboard having a plurality of user selectable keys;
  a driver receiving said events, said driver sensing user contact on said touch sensitive panel within said keyboard window and generating messages in response thereto; and
  a controller executing a keyboard application and receiving said messages, said keyboard application processing said messages to provide data to the active application running on said computer corresponding to keys of said keyboard contacted by said user.

According to still yet another aspect of the present invention there is provided in an electronic writeboard having a touch sensitive panel on which an on-screen keyboard is displayed, where user contact on said touch sensitive panel results in the generation of mouse events conveyed to a computer for processing, a method of inhibiting input focus being switched from an active application executed by said computer to said on-screen keyboard when said on-screen keyboard is touched, said method comprising the steps of:

detecting user contact on said touch sensitive panel;

forwarding events generated in response to contact on said touch sensitive panel outside of said on-screen keyboard directly to said computer; and processing events generated in response to contact on said touch sensitive panel within said on-screen keyboard and forwarding said processed events to said active application.

The present invention provides advantages in that when the on-screen keyboard is used to enter text data into an active application, the active application does not flicker or close its open menus. This is achieved by inhibiting input focus from changing to the on-screen keyboard when it is touched. Also, since input focus does not change, text insertion points in active applications are not lost when the on-screen keyboard is used to enter data into the active application.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
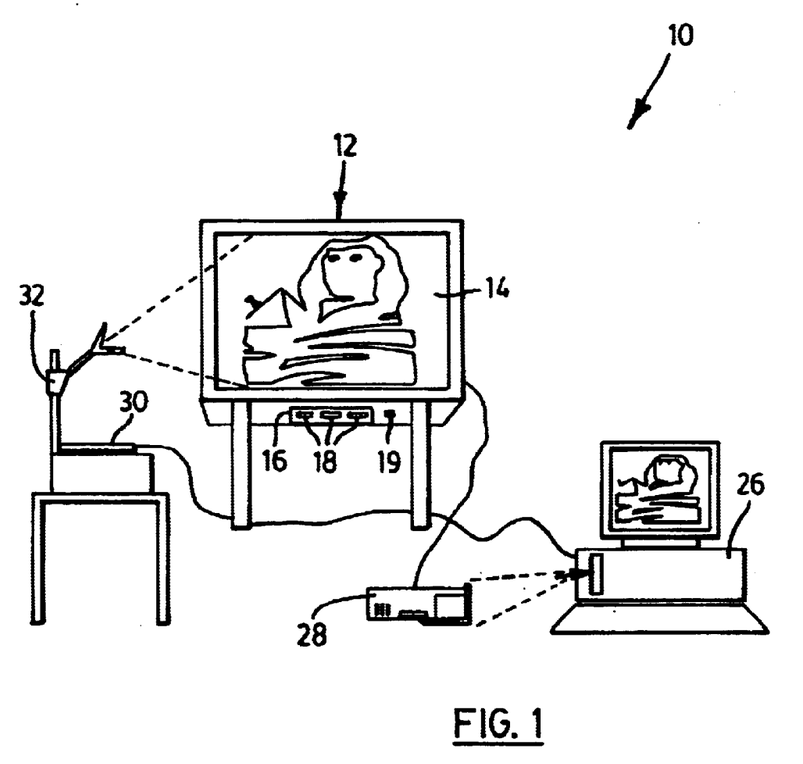
FIG. 1 is a schematic view of an interactive display system including an electronic writeboard having a touch sensitive panel.

Referring now to FIG. 1, an interactive display system is shown and is generally indicated to by reference numeral 10. As can be seen, interactive display system 10 includes an electronic writeboard 12 (EWB) of the type manufactured by SMART Technologies Inc. under model No. SB360 and sold under the name SMART Board. The SMART Board 12 includes a touch sensitive panel 14 and a tool tray 16 accommodating a plurality of tools 18 and having at least one user selectable button 19. The tools 18 include a number of colored pens and an eraser. A controller 28 having memory is installed in a slot of a personal computer 26 and executes a controller application to control the overall operation of the SMART Board 12. A driver in the form of an application is executed by the personal computer 26 and translates serial data from the controller 28 into events such as mouse events, tool change events and button press events.

The personal computer 26 is connected to a liquid crystal display panel 30 positioned on an overhead projector 32 so that the screen image presented on the monitor of the personal computer is projected onto the touch sensitive panel 14. As will be appreciated, the touch sensitive panel can be placed in front of a rear projection system.

The SMART Board 12 can operate either in a projection mode or in a non-projection mode. As mentioned previously, in the projection mode, screen images generated by the personal computer 26 are projected onto the touch sensitive panel 14 and the SMART Board 12 functions as a giant mouse. In the non-projection mode, the touch sensitive panel 14 is mapped onto the drawing area of the running application so that writing and erasing on the touch sensitive panel 14 is stored as a computerized image and projected onto the touch sensitive panel.

When the electronic writeboard 12 and the personal computer 26 are connected and initialized, the electronic writeboard driver registers with the writeboard applications software executed by the personal computer. During this registration process, the driver determines the messages to which the applications software responds. Once the registration process has been completed, events generated by the SMART Board 12 as a result of user contact with the touch sensitive panel, selection of a tool, pressing of a button etc. are sent to the applications software.

If the applications software is not "aware" of the SMART Board 12 such as Microsoft NetMeeting i.e. the applications software does not use the SMART Board SDK source code, the personal computer 26 executes Aware interface software to interface the SMART Board 12 and the applications software. Specifics of the Aware interface software are described in co-pending U.S. application Ser. No. 08/962, 039 filed on Oct. 31, 1997 and assigned to the assignee of the present invention, the contents of which are incorporated herein by reference.

In the preferred embodiment, the personal computer 26 runs a Windows® 95 platform and executes a variety of applications programs. In the projection mode, touching the touch sensitive panel results in mouse events being generated and processed by the personal computer. To allow a user to enter text data into an active application executed by the personal computer without having to use the keyboard of the personal computer 26, the controller 28 executes a keyboard application so that an on-screen keyboard 40 is presented within a window ("form") on the touch sensitive panel 14 (see FIG. 2). As can be seen, the on-screen keyboard 40 includes a plurality of selectable keys 42 and in this embodiment is based on a "QWERTY" layout.

Figure 2:
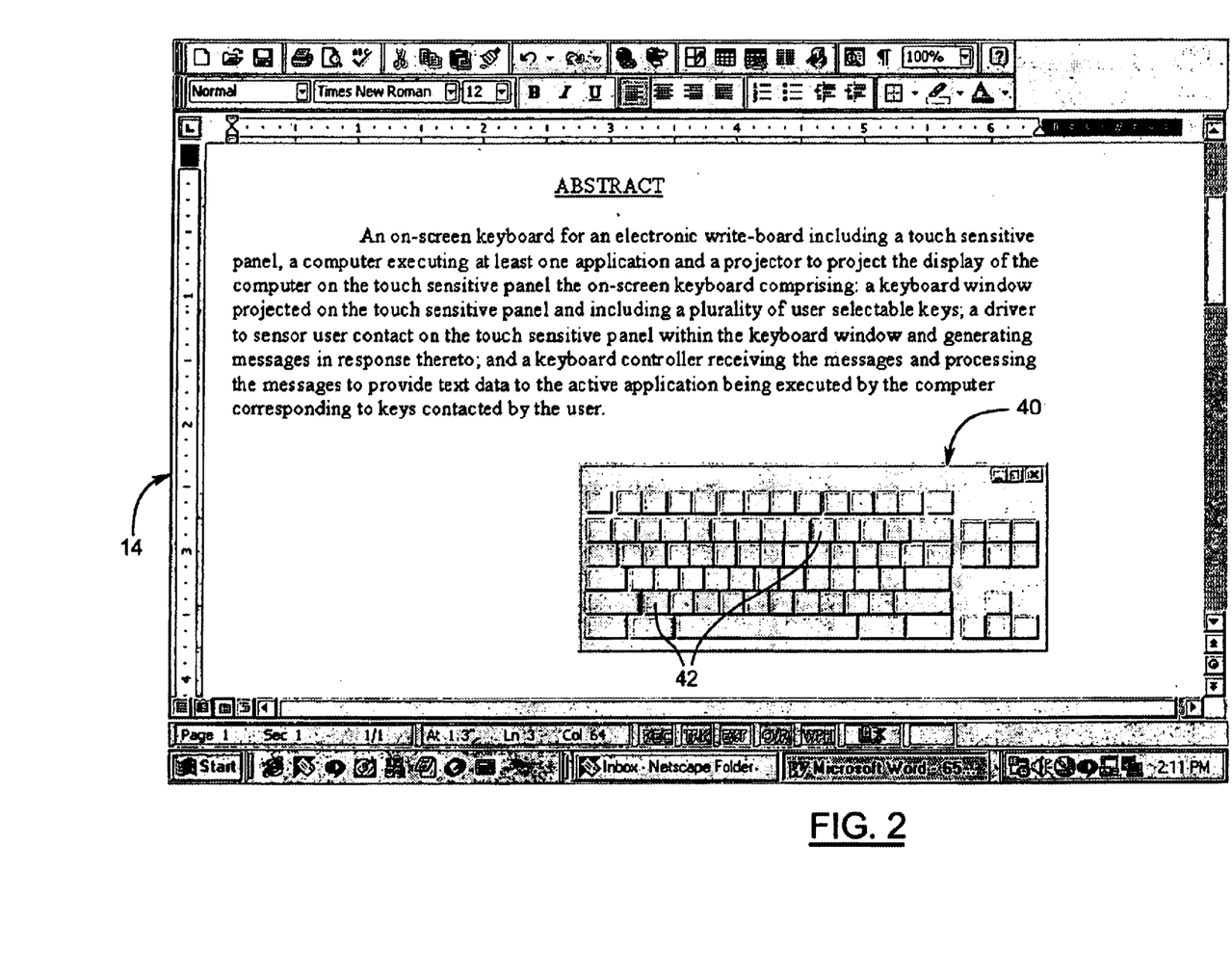
FIG. 2 is a front view of the touch sensitive panel of FIG. 1 on which an active application and an on-screen keyboard in accordance with the present invention are projected.

Unlike conventional prior art on-screen keyboards, the on-screen keyboard 40 in accordance with the present invention allows a user to enter data into an active application by touching the on-screen keyboard without input focus changing to the on-screen keyboard even though the personal computer 26 runs on a Windows® platform. To achieve this, the driver and the controller 28 invoke a private communication mechanism so that mouse events generated as a result of contact with the touch sensitive panel 14 within the on-screen keyboard window are sent directly to the controller 28 instead of being routed through Windows®. In this manner, the code in Windows® responsible for the automatic activation and deactivation of applications in response to mouse events is bypassed. Thus, the controller 28 is able to process on-screen keyboard events without input focus changing. As a result, the problems associated with prior art on-screen keyboards described previously are overcome. Further specifics of the private communication mechanism established between the driver and the controller 28 will now be described with particular reference to FIG. 3.

Figure 3:
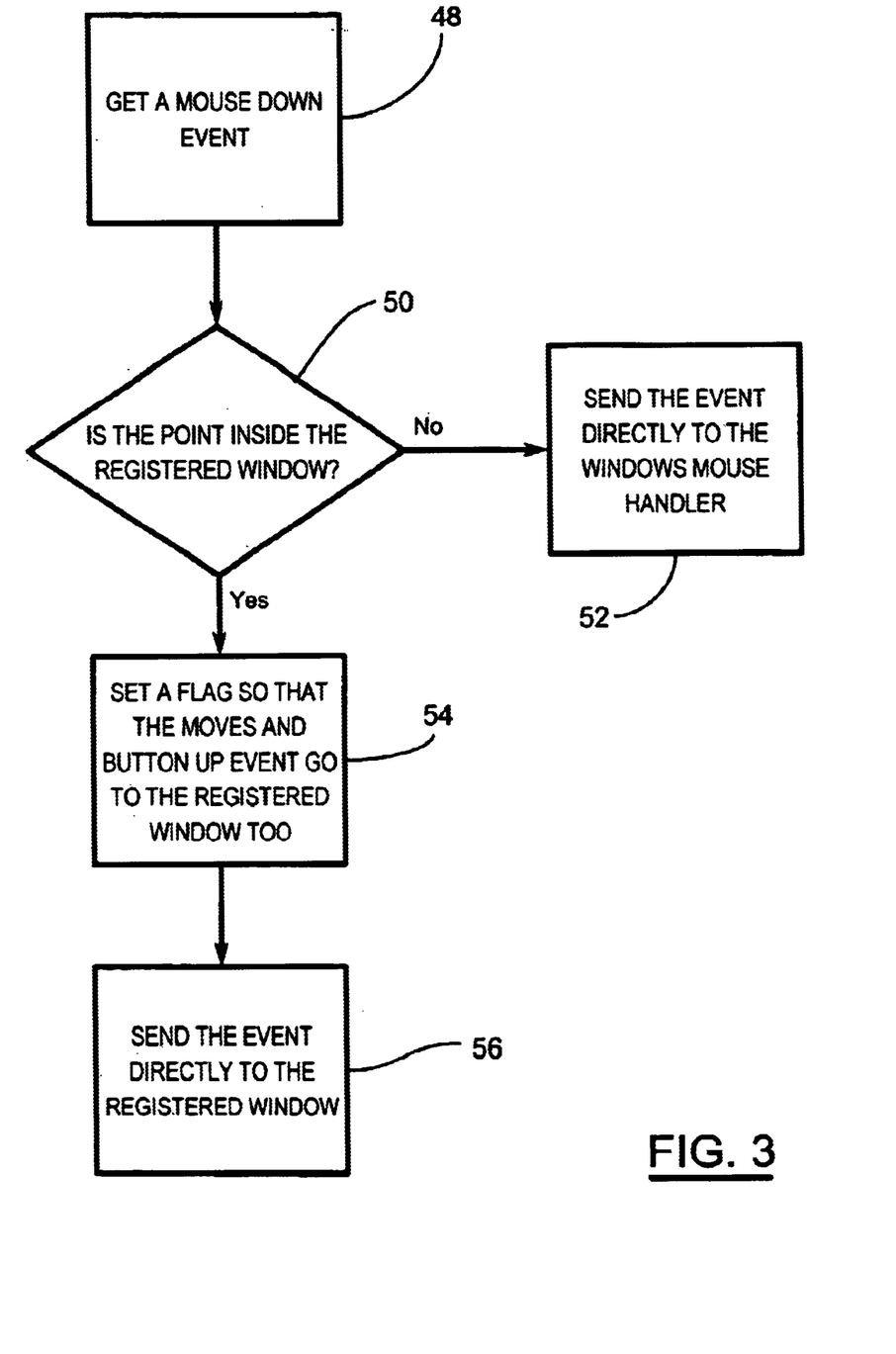
FIG. 3 is a flow chart illustrating the steps performed by the electronic writeboard when the on-screen keyboard is used to enter data into an active application.

In operation, when the SMART Board 12 is initiated, the controller 28 registers the on-screen keyboard 40 with the driver by submitting two pieces of information to the driver. The first piece of information is the window handle of the keyboard window, which includes its position on the touch sensitive panel 14. The second piece of information is a set of message identifiers and flags, which allows the driver to communicate with the keyboard application executed by the controller 28.

Once the controller 28 has registered with the driver, when a user contacts the touch sensitive panel 14 and a mouse event is generated (block 48), the driver checks to see if the mouse down event occurred within the keyboard window (block 50). If the mouse down event occurred outside of the keyboard window, the driver simply sends the mouse event to Windows® (block 52). Windows® in turn handles the mouse down event in the conventional manner and the driver awaits the next mouse event.

If the mouse down event occurs within the keyboard window, the driver notifies the controller 28 of the mouse down event using the set of message identifiers and flags. The driver also sets a second flag so that all subsequent mouse events are sent to the keyboard application until a mouse up event is detected. When the controller 28 receives the identifiers and flags, which represent the key selected by the user, the keyboard application proceeds to process the mouse down event and sends the selected key data to the active application with input focus. The text corresponding to the activated key 42 of on-screen keyboard is therefore, entered into the active application (blocks 54 and 56).

If a mouse move event or a mouse up event is generated, the driver checks to see if the flag was set to determine whether the event should be sent to the controller 28. If the flag is set, the mouse move or mouse up event is sent to the keyboard application for processing. If the flag is not set, the mouse event is sent to Windows®.

This process is repeated for each mouse down event so that mouse events occurring within the keyboard window bypass Windows® and thereby inhibit input focus changing from the active application to the on-screen keyboard 40. Source code for the driver and controller to perform the above-described operation is set out in Appendix A.

It is possible for the on-screen keyboard 40 to become active and gain input focus through use of an Alt-Tab hotkey sequence or through the Windows® Task Manager. If the on-screen keyboard 40 becomes active, the controller 28 automatically notifies Windows® to switch input focus to the next application in the Windows® task list. In this manner, if input focus is inadvertently switched to the on-screen keyboard 40, it is quickly switched to another application.

As will be appreciated, the present invention allows an on-screen keyboard to be used to enter text into an active application while avoiding the problems associated with prior art on-screen keyboards.

Although the electronic writeboard 12 has been described as a SMART Board including a tool tray with colored pens and an eraser, those of skill in the art will appreciate that the on-screen keyboard can be used with other electronic writeboards, which use software tool panels to allow a user to select a tool. Also, although a preferred embodiment of the present invention has been described, those of skill in the art will appreciate that variations and modifications may be made without departing from the spirit and scope thereof as defined by the appended claims.

APPENDIX A

KEYBOARD APPLICATION
STRUCTURE registrationBlock
{
    WORD messageType;
    WORD downMessage;
    WORD upMessage;
    WORD moveMessage;
    WINDOW windowHandle;
};

APPENDIX A-continued

```
WINDOW
smartBoardDriverWindow=FindWindow(driver_class_name,driver_title);
if (EXISTS(smartBoardDriverWindow))
{
    //create a block of data that we use to pass information to the driver
    registrationBlock myBlock;
    //The driver asks as what messages we would like to receive for the various
    //mouse movement events.
    myBlock.messageType=REGISTER_MOUSE;
    myBlock.downMessage=DOWN_MESSAGE;
    myBlock.upMessage=UP_MESSAGE;
    myBlock.moveMessage=MOVE_MESSAGE;
    myBlock.windowHandle=mainWindowHandle;
    //Use a special windows message called COPYDATA to send a block
    //of information to the driver
    SendMessage(smartBoardDriverWindow,WM_COPYDATA,&myBlock);
}
OnDownMessage(POSITION pos,FLAGS flags)
{
    savedbutton=GetButtonFromPosition(pos);
    if (savedbutton!=0)
    {
        savebutton.drawpusheddown();
    }
}
OnMoveMessage(POSITION pos,FLAGS flags)
{
    //No button was pressed, so ignore moves.
    if (savedbutton=0)
        return;
    BUTTON newbutton=GetButtonFromPosition(pos);
    if (newbuton!=savedbutton)
    {
        //move button up if mouse moves of it
        newbutton.Drawunpushedbutton();
        return;
    }
    else
    {
        newbutton.Drawpushedbutton();
    }
}
OnUpMessage(POSITION pos)
{
    //No button was pressed, so ignore the up
    if (savedbutton=0)
        return;
    if (GetButtonFromPosition(pos)!=savedButton)
        return;
    savedbutton.Drawunpushedbutton();
    savedbutton.SendKeyPressToWindows();
    savedbutton=0;
}
BOARD DRIVER APPLICATION
void HandleBoardRegistrationBlock(registrationBlock theBlock)
{
    //When we get the block from the keyboard asking for us to register it to get
    //mouse events directly
    //we store it in a list of these blocks so that many applications can use this
    //approach if needed.
    listOfRegisteredBlocks.AddToEnd(theBlock);
}
//This function is called when the board driver is about to send a mouse
//down to the system.
void HandleMouseDownEvent(POSITION pos,FLAGS flags)
{
    //What window are we pushing on.
    WINDOW PressedOn=WIndowFromPoint(pos);
    //is it one of our registered windows?
    for (INTEGER i=0;i<listOfRegisteredBlocks.GetNumberOfBlocks();i++)
    {
        registrationBlock
        block=listOfRegisteredBlocks.GetBlockByIndex(i);
        if (block.windowHandle=PressedOn)
        {
            //Press was on the registered window. Send it the message
SendMessage(RegisteredWindow,block.downMessage,flags,pos);
            //save the handle so that all events until the up event can go to
            //the same place.
```

APPENDIX A-continued

```
            blockForSubsequentEvents=block;
            return;
        }
    }
    //The window we are clicking on is not one of our registered windows, so
    //send the events directly to the operating system
    blockForSubsequentEvents=0;
    SendMessageToSystem(WM_LBUTTONDOWN,flags,pos);
}
void HandleMouseMoveEvent(POSITION pos,FLAGS flags)
{
    //If we sent the down event to a special window all subsequent events must go
    //there too
    if (blockForSubsequentEvents!=0)
    {
        //Press was on the registered window. Send it the message
        SendMessage(blockForSubsequentEvents.windowHandle,
            blockForSubsequentEvents.downMessage,flags,pos);
    }
    else
    {
        SendMessageToSystem(WM_MOUSEMOVE,flags,pos);
    }
}
void HandleMouseUpEvent(POSITION pos,FLAGS flags)
{
    //If we sent the down event to a special window all subsequent events must go
    //there too
    if (blockForSubsequentEvents!=0)
    {
        //Press was on the registered window. Send it the message
        SendMessage(blockForSubsequentEvents.windowHandle,
            blockForSubsequentEvents.upMessage,flags,pos);
    }
    else
    {
        SendMessageToSystem(WM_LBUTTONUP,flags,pos);
    }
    blockForSubsequentEvents=0;
        //reset it. It will be initialized again on the next button down.
}
```

I claim:

1. An electronic writeboard for communicating with a computer running on a windows type operating platform, said computer including applications software and running an active application having input focus comprising:

a touch sensitive panel on which screen image output of said computer is displayed, said touch sensitive panel being responsive to user contact and generating events;

a keyboard window displayed on said touch sensitive panel and including a keyboard having a plurality of user selectable keys;

a driver receiving events generated by said touch sensitive panel, said driver sensing user contact on said touch sensitive panel within said keyboard window and generating messages in response to user selection of keys of said keyboard; and a controller executing a keyboard application and receiving said messages, said keyboard application processing said messages to provide data directly to the active application running on said computer corresponding to keys of said keyboard contacted by said user to bypass the computer operating system and thereby avoid input focus shifting to said keyboard application in response to user contacts on said touch sensitive panel within said keyboard window.

2. An electronic writeboard as defined in claim 1 wherein said driver passes events generated as a result of user contact on said touch sensitive panel outside of said keyboard window directly to said computer for processing.

3. An electronic writeboard as defined in claim 2 wherein during initialization, said controller registers with said driver and provides a keyboard window handle establishing the location of said keyboard window on said touch sensitive panel and a set of message identifiers to allow said driver to communicate with said keyboard application.

4. An electronic writeboard as defined in claim 3 wherein said driver uses said message identifiers to generate a message to said keyboard application in response to a mouse down event resulting from user contact on said touch sensitive panel within said keyboard window, said driver setting a flag so that subsequent mouse events result in the generation of messages to said keyboard application until a mouse up event is detected.

5. An electronic writeboard as defined in claim 1 wherein said keyboard application signals said computer to switch input focus automatically to another application if input focus is given to said keyboard application.

6. An interactive display system comprising:

an electronic writeboard;

a computer running on a windows based operating platform connected to said electronic writeboard, said computer including applications software and running an active application having input focus, and a projector coupled to said computer and projecting screen image output of said computer onto said electronic writeboard, wherein said electronic writeboard includes:

a touch sensitive panel on which the screen image output of said computer is displayed, said touch sensitive panel being responsive to user contact and generating events;

a keyboard window displayed on said touch sensitive panel and including a keyboard having a plurality of user selectable keys;

a driver receiving events generated by said touch sensitive panel, said driver sensing user contact on said touch sensitive panel within said keyboard window and generating messages in response to user selection of keys of said keyboard; and a controller executing a keyboard application and receiving said messages, said keyboard application processing said messages to provide data directly to the active application running on said computer corresponding to keys of said keyboard contacted by said user to bypass the computer operating system and thereby avoid input focus shifting to said keyboard application in response to user contacts on said touch sensitive panel within said keyboard window.

7. An interactive display system as defined in claim 6 wherein said driver passes events generated as a result of user contact on said touch sensitive panel outside of said keyboard window directly to said computer for processing.

8. An interactive display system as defined in claim 7 wherein during initialization, said controller registers with said driver and provides a keyboard window handle establishing the location of said keyboard window on said touch sensitive panel and a set of message identifiers to allow said driver to communicate with said keyboard application.

9. An interactive display system as defined in claim 8 wherein said driver uses said message identifiers to generate a message to said keyboard application in response to a mouse down event resulting from user contact on said touch sensitive panel within said keyboard window, said driver setting a flag so that subsequent mouse events result in the generation of messages to said keyboard application until a mouse up event is detected.

10. An interactive display system as defined in claim 6 wherein said keyboard application signals said computer to switch input focus automatically to another application if input focus is given to said keyboard application.

11. In an electronic writeboard having a touch sensitive panel on which an on-screen keyboard is displayed within a window, where user contact on said touch sensitive panel results in the generation of mouse events conveyed to a computer running on a windows based operating system for processing, a method of inhibiting input focus from being switched from an active application executed by said computer to said on-screen keyboard when said on-screen keyboard is touched, said method comprising the steps of:

detecting user contact on said touch sensitive panel;

forwarding events generated in response to contact on said touch sensitive panel outside of said on-screen keyboard window directly to said operating system for processing; and processing events generated in response to contact on said touch sensitive panel within said on-screen keyboard window and forwarding said processed events directly to said active application thereby to bypass said Windows®-based operating system and inhibit a shift in input focus from said active application to said on-screen keyboard.

12. An electronic writeboard as defined in claim 5 wherein input focus is switched automatically to the next application in the Windows® task list.

13. An interactive display system as defined in claim 10 wherein input focus is switched automatically to the next application in the Windows® task list.

14. The method of claim 11 further comprising the step of automatically shifting input focus to another application if input focus is given to said on-screen keyboard.

15. An on-screen keyboard application for execution by a processor running an active application having input focus in a windows based operating environment comprising:

first program code installable in the processor and causing the processor to display on a touch sensitive display screen within a window, a keyboard having a plurality of user selectable keys;

second program code installable in the processor and causing the processor to sense contact on the touch sensitive display screen within the keyboard window and generating events corresponding to keys contacted by a user; and third program code installable in the processor and causing the processor to process the events and send data to the active application being run by the processor without shifting input focus to the on-screen keyboard application as result of contacts on said touch sensitive display within said keyboard window.

16. An on-screen keyboard application as defined in claim 15 wherein said second program code sends events generated in response to contact on the touch sensitive display outside of the keyboard window to said processor without said events being processed by said third program code.

17. An on-screen keyboard application as defined in claim 16 further comprising fourth program code installable in the processor and causing the computer to shift automatically input focus to another application if input focus is given to said on-screen keyboard application.

18. In a computer running on a windows type platform having code responsible for the automatic activation and deactivation of an application in response to mouse events and executing an active application having input focus, a method of inputting data to the active application via a touch sensitive on-screen application displayed within a window while inhibiting input focus from being switched to said on-screen application as result of contacts within said window, said method comprising the steps of:

detecting user contact on said on-screen application within said window and generating events corresponding to said user contact; and conveying data directly to the active application corresponding to the events thereby to bypass said code.

19. The method of claim 18 further comprising the step of shifting input focus automatically to another application if input focus is given to said on-screen application.

20. Apparatus for controlling the display of images projected through a projector and generated by a computer running application programs on a windows operating system, said apparatus comprising:

a large screen display uncoupled from the projector, which displays the computer-generated image, and which outputs a location signal corresponding to a location on the large-screen display where contact is made;

software running as an interrupt routine on the Windows® operating system of the computer, the interrupt routine generating a mouse event in response to said location signal, the software additionally causing the application program to modify the computer-generated image in response to the mouse event; and on-screen keyboard application software executed by said computer and causing the computer to display as part of the computer-generated image an on-screen keyboard within a window, said on-screen keyboard application detecting and processing mouse commands generated as a result of user contact on said large-screen display within said window and conveying data to an active application program run by said computer while bypassing the Windows® operating system.

21. Apparatus according to claim 20 wherein said on-screen keyboard application software causes said computer to shift automatically input focus to another application if input focus is given to said on-screen keyboard application software.

22. Apparatus according to claim 21 wherein said on-screen keyboard has a QWERTY layout.

23. Apparatus according to claim 20, wherein said large-screen display comprises a touch sensitive screen.

24. Apparatus according to claim 23, further comprising the image projector which comprises:

an LCD projector coupled to the computer; and an overhead projector adjacent said LCD projector.

25. A method for controlling the display of images projected through a projector and generated by a computer running application programs on a windows operating system, comprising the steps of:

displaying the computer-generated image on a large-screen display uncoupled from the projector, the computer-generated image in part including an on-screen keyboard within a keyboard window;

outputting a location signal corresponding to a location on the large-screen display where contact is made;

running an interrupt routine on the Windows® operating system of the computer, the interrupt routine generating a mouse event in response to said location signal; and causing the application program to modify the computer-generated image in response to the mouse event, the computer-generated image being modified at the location on the large-screen display corresponding to the location where contact is made, wherein mouse events generated in response to contacts made on the large-screen display within the keyboard window are processed via a private communication mechanism so that data corresponding to the mouse events is sent to the active application program being run by the computer without being routed through the Windows® operating system.

26. A storage medium storing computer code for controlling the display of images projected through a projector and generated by a computer running application programs on a windows operating system, the stored computer code causing the computer to perform the steps of:

generating display signals for displaying a computer-generated image on a large-screen display uncoupled from the projector;

in response to receiving a location signal corresponding to a location on the large-screen display where a contact is made, running interrupt routine on the Windows® operating system of the computer, the interrupt routine generating a mouse event in response to said location signal; and causing an application program running on the computer to modify the computer-generated image in response to the mouse event, the computer-generated image modified at the location on the large-screen display corresponding to the location contact is made, wherein mouse events generated in response to contacts made on the large-screen display within the keyboard window are processed via a private communications mechanism so that data corresponding to the mouse events is sent to the active application program being run by the computer without being routed through the Windows® operating system.

* * * * *

UNITED STATES PATENT AND TRADEMARK OFFICE
CERTIFICATE OF CORRECTION

PATENT NO. : 6,741,267 B1  
DATED : May 25, 2004  
INVENTOR(S) : Taco Van Ieperen It is certified that error appears in the above-identified patent and that said Letters Patent is hereby corrected as shown below:

Title page,
Item [12], United States Patent, "Leperen" should read -- Ieperen --.
Item [75], Inventor, "Taco Van Leperen" should read -- Taco Van Ieperen --.

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,741,267 B1 Page 1 of 1
APPLICATION NO. : 09/182475
DATED : May 25, 2004
INVENTOR(S) : Taco Van Ieperen It is certified that error appears in the above-identified patent and that said Letters Patent is hereby corrected as shown below:

On the Cover Page, under (12) United States Patent "Leperen" should read --Ieperen--.

On the Cover page, next to (75) Inventor: "Taco Van Leperen" should read --Taco Van Ieperen--.

Signed and Sealed this

Twenty-fifth Day of March, 2008

JON W. DUDAS
*Director of the United States Patent and Trademark Office*